United States Patent
Wada

(10) Patent No.: US 11,215,564 B2
(45) Date of Patent: Jan. 4, 2022

(54) VISUAL INSPECTIONS DEVICE, METHOD OF MANUFACTURING AND PROGRAM THE SAME

(71) Applicant: RENESAS ELECTRONICS CORPORATION, Tokyo (JP)

(72) Inventor: Hideki Wada, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 69 days.

(21) Appl. No.: 16/863,508

(22) Filed: Apr. 30, 2020

(65) Prior Publication Data

US 2021/0341394 A1 Nov. 4, 2021

(51) Int. Cl.
*G01N 21/88* (2006.01)

(52) U.S. Cl.
CPC . *G01N 21/8803* (2013.01); *G01N 2021/8887* (2013.01)

(58) Field of Classification Search
CPC .... G02B 5/08; G02B 19/0071; G02B 27/144; G02B 5/0215; G02B 5/0231; G02B 5/0284; G02B 21/084; F21Y 101/02; G01N 21/8806; G01N 2021/8819; G01N 2021/8887; G01N 21/8803; G06K 9/2036
USPC .................. 356/237.2–237.6, 364–369, 445
See application file for complete search history.

(56) References Cited

U.S. PATENT DOCUMENTS

| | | | | |
|---|---|---|---|---|
| 5,917,594 A | * | 6/1999 | Norton | G01J 3/42 356/327 |
| 7,248,364 B2 | * | 7/2007 | Hebert | G02B 17/0663 356/369 |
| 8,931,939 B2 | * | 1/2015 | Melzner | F21V 7/048 362/512 |
| 9,109,781 B2 | * | 8/2015 | Holder | F21V 5/04 |
| 9,831,626 B2 | * | 11/2017 | Ryu | H01S 3/0071 |
| 2014/0372075 A1 | * | 12/2014 | Kojima | G01N 21/55 702/167 |

FOREIGN PATENT DOCUMENTS

| | | | | |
|---|---|---|---|---|
| EP | 2592328 A1 | * | 5/2013 | ........ G06K 9/2036 |
| JP | 2004125644 A | * | 4/2004 | ....... G01N 21/95684 |
| JP | 2012-256627 A | | 12/2012 | |
| JP | 2015-145869 A | | 8/2015 | |

* cited by examiner

*Primary Examiner* — Isiaka O Akanbi
(74) *Attorney, Agent, or Firm* — McDermott Will & Emery LLP

(57) ABSTRACT

The visual inspection device comprises a first illumination device capable of illuminating an top surface of an inspection object, a second illumination device capable of illuminating a bottom surface opposite to the top surface of the inspection object and a first imaging device capable of capturing the top surface of the inspection object. A relative position of each of the first illumination device and the second illumination device and the inspection object are adjusted such that a part of the captured image captured by the first imaging device is disappeared.

16 Claims, 15 Drawing Sheets

FIG. 9
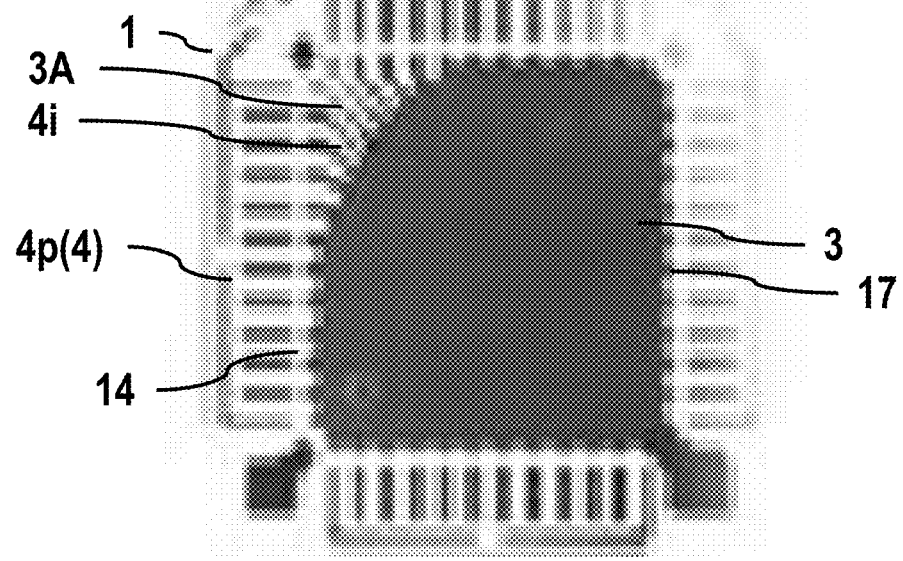
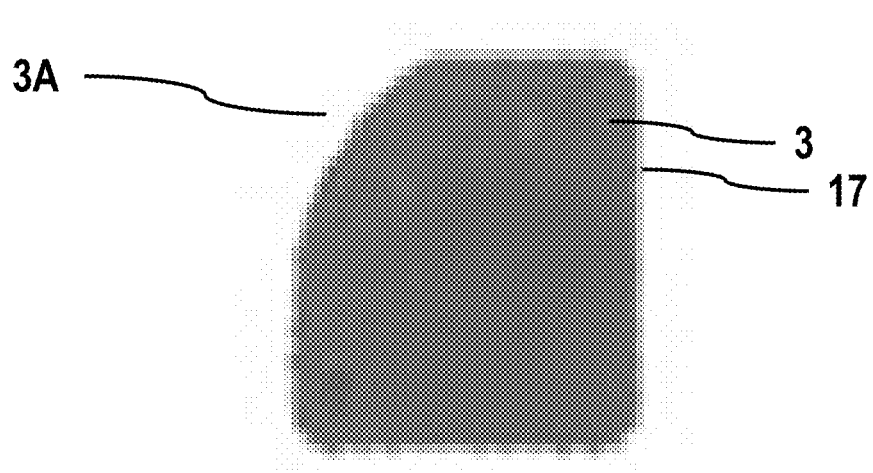

Cut out the image centering on the abnormal part

VISUAL INSPECTIONS DEVICE, METHOD OF MANUFACTURING AND PROGRAM THE SAME

BACKGROUND

A lead frame having a resin sealing body may be inspected for a presence or absence of an unfilled region of the resin or the like by performing a visual inspection of the resin sealing body. Japanese Patent Laid-Open No. JP-A-2012-256627 (Patent Document 1) has been proposed for visual inspections of this type. As shown in FIGS. 17 and 18 of Patent Document 1, the lead frame (1) with the resin sealing body to be inspected is placed between the camera (69) and the illumination device (67) to inspect the appearance of the resin sealing body.

Also, a dome-shaped illumination device may be used in a visual inspection system that acquire and inspect images of the appearance of electronic components. Japanese Patent Laid-Open No. JP-A-2015-145869 (Patent Document 2) has been proposed as the visual inspection system of this type. As shown in FIG. 2 of Patent Document 2, the dome-shaped illumination module (1) is arranged between the camera module (2) and the inspection object (P) and the appearance of the inspection object (P) is inspected.

SUMMARY

The inventors have investigated an image determination using artificial intelligence (AI) in order to determine a presence or absence of a defect occurring in a sealing body in a visual inspection of a lead frame having the resin sealing body. In the visual inspection examined by the inventors, a upper surface of the lead frame having the sealing body is irradiated with one illumination device, reflected light reflected from the lead frame having the sealing body is captured by a camera, and the image determination using artificial intelligence (AI) is performed on a basis of images captured by the camera. The images taken by the camera include the sealing body constituting a packaging surface of the semiconductor device and the lead frame around the sealing body. That is, the lead frame that is not to be inspected is reflected as a background around the sealing body in images taken when the sealing body constituting the packaging surface of the semiconductor device is inspected. The images of the lead frame have a large change in the material of the lead frame, a pattern of slits between leads, the background reflected in the slits, and the like. Therefore, it has been found that a large number of reference images at the time of creating a learning model is necessary in the image determination using artificial intelligence (AI). It was also found that a change in the background was much larger than a change in the object to be inspected (here, the sealing body), and therefore an improvement in a correct answer rate of the image determination using the artificial intelligence (AI) could not be expected.

An object of the present disclosure is to provide a technique capable of removing or eliminating reflection of the lead frame in images obtained by image capturing the lead frame having the resin sealing body.

Other objects and novel features will become apparent from the description of this specification and the accompanying drawings.

BRIEF DESCRIPTION OF THE DRAWINGS

FIG. 9 is a diagram illustrating another exemplary captured image captured by the first image capturing device and the second image capturing device.

DETAILED DESCRIPTION

Figure 1:
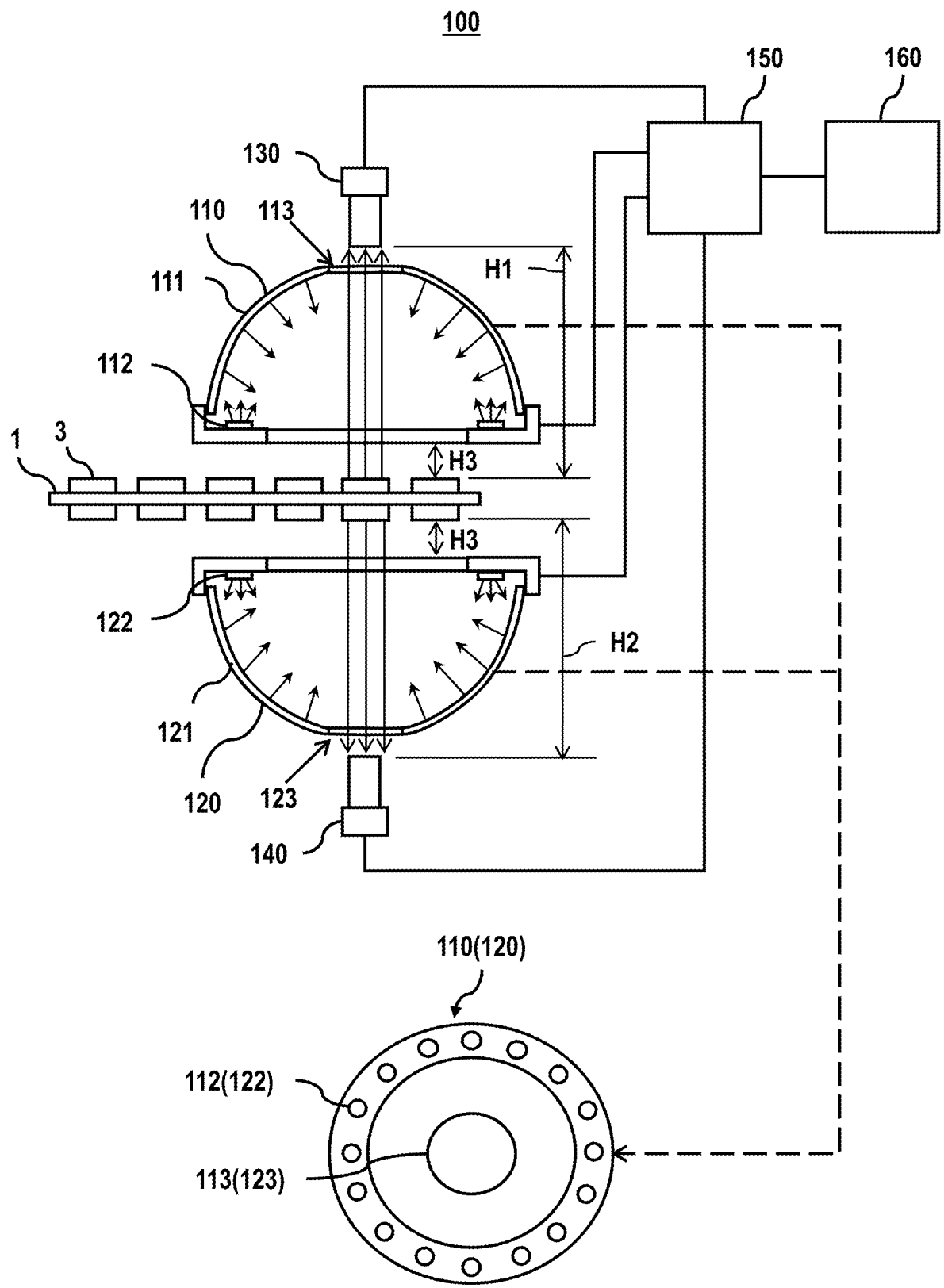
FIG. 1 is a diagram for explaining a main portion of a visual inspection device according to an embodiment.

Embodiment will be described below with reference to the drawings. However, in the following description, the same components are denoted by the same reference numerals, and a repetitive description thereof may be omitted. It should be noted that the drawings may be represented schematically in comparison with actual embodiment for the sake of clarity of explanation, but are merely an example and do not limit the interpretation of the present invention.

FIG. 1 is a diagram for explaining a main portion of the visual inspection device according to an embodiment. The visual inspection device 100 is an inspection device for inspecting an appearance of a plurality of resin sealing bodies 3 provided in a lead frame 1. The visual inspection device 100 includes a first illumination device 110, a second illumination device 120, a first imaging device 130, a second imaging device 140, a first control device 150, and a second control device 160.

The first illumination device 110 is configured to be capable of irradiating light (first light) to top surfaces of the plurality of resin sealing bodies 3 and a top surface of the lead frame 1, which are to be an inspection object. The second illumination device 120 is configured to be capable of irradiating light (second light) to bottom surfaces opposite to the top surfaces of the plurality of resin sealing bodies 3 and a bottom surface opposite to top surface of the lead frame 1.

The first imaging device 130 is configured to be capable of image capturing the top surfaces of the plurality of resin sealing bodies 3 to be inspected and the top surface of the lead frame 1. The second imaging device 140 is configured to be capable of image capturing the bottom surfaces of the plurality of resin sealing bodies 3 to be inspected and the bottom surface of the lead frame 1. The first imaging device 130 and the second imaging device 140 can simultaneously capture images of 9 resin sealing bodies 3, such as 3×3 manner. The number of the resin sealing bodies 3 simultaneously captured by the first imaging device 130 and the second imaging device 140 can be variously changed in accordance with the sizes and layouts of the plurality of resin sealing bodies 3 provided on the lead frame 1, such as 1×3, 2×2, 3×4, etc. manner. A captured image captured by each of the first imaging device 130 and the second imaging device 140 are multi-tone inspected image data.

Each of the first imaging device 130 and the second imaging device 140 preferably using such as a CCD camera having 25 million pixel or the like and adapting focus length of 50 mm, an F-value of 2.5, an image field of view of X=80 mm and Y=98 mm, resolution of X=17.5 μm/pix and Y=21.4 μm/pix. When a minimum detection size is 0.2 mm (200 μm), the resolution is preferably 40 μm/pix or less when five or more pixels are required.

The first control device 150 is a control device for controlling the visual inspection device 100, in an example, is composed of a computer or the like. The first control device 150 is coupled to the first illumination device 110, the second illumination device 120, the first imaging device 130 and the second imaging device 140, and can control their operations and functions. The first control device 150 can control an irradiation of light from the first illumination device 110, an irradiation of light from the second illumination device 120, an illuminance of light of each of the first illumination device 110 and the second illumination device 120, and the like. The first control device 150 can further control image capturing by the first imaging device 130, image capturing by the second imaging device 140, and the like. The first control device 150 can also control a height (distance) H1 between the first imaging device 130 and the top surfaces of the plurality of resin sealing bodies 3 and a height (distance) H2 between the second imaging device 140 and the bottom surfaces of the plurality of resin sealing bodies 3 to adjust a focus position of the first imaging device 130 and the second imaging device 140. The heights (distances) H1 and H2 are, in an example, a range from 295 mm to 316 mm.

Wavelengths of the first light and the second light illuminated on the top surface and the bottom surface of the lead frame 1 are, for example, 400 nm or more and 750 nm or less. The first control device 150 sets the illuminance of the first light and the second light illuminated from the first illumination device 110 and the second illumination device 120 to, for example, 10,360 lux or more and 10,560 lux or less, more preferably around 10,460 lux, when the lead frame 1 is made of a metallic material containing copper as a main component. The first control device 150 also sets an illuminance of the first light and the second light illuminated from the first illumination device 110 and the second illumination device 120 to, for example, 8,750 lux or more, 8,950 lux or less, more preferably, around 8,850 lux, when the lead frame 1 is a metallic material based on 42 alloy. As a result, a brightness (gradation) of the top surfaces and the bottom surfaces of the plurality of resin sealing bodies 3 can be set to a desired brightness in captured images. In addition, it is possible to reduce a change in the captured images due to a material of the lead frame 1.

The first control device 150 can inspect the plurality of resin sealing bodies 3 for a presence or an absence of a defect on the captured images captured by the first imaging device 130 and the second imaging device 140. When the first control device 150 determines that the plurality of resin sealing bodies 3 are defective, partially captured images corresponding to defective portions or abnormal portions of the plurality of resin sealing bodies 3 are extracted from the captured images captured by the first imaging device 130 and the second imaging device 140, and an extracted images can be transmitted to the second control device 160.

Examples of the defective portions or the abnormal portions generated in the plurality of resin sealing bodies 3 include a poor-filling of the resin, a contamination of top surface or the bottom surface of the resin sealing body, a void generated in top surface or the bottom surface of the resin sealing body, a foreign substance existing in top surface or the bottom surface of the resin sealing body, a scratch of top surface or the bottom surface of the resin sealing body, a blister of the resin generated in top surface or the bottom surface of the resin sealing body, a dent of the resin generated in top surface or the bottom surface of the resin sealing body, and the like.

The second control device 160 is a control device for performing an image determination using artificial intelligence (AI) on the extracted images inputted from the first control device 150, in an example, the second control device 160 is composed of a computer or the like. The second control device 160 is connected to a data base in which a learned model relating to the defective portions or the abnormal portions occurring in the plurality of resin sealing bodies 3 is stored, and calculates a feature quantity for extracted images based on image data in the learned model. The second control device 160 determines that defects or abnormalities relating to the extracted images have occurred in the plurality of resin sealing bodies 3 when the feature quantity are equal to or greater than a predetermined value, and performs a final determination of defective products. On the other hand, when the feature quantity is lower than the predetermined value, the second control device 160 determines that no defect or no anomaly relating to the extracted images have occurred in the plurality of resin sealing bodies 3, and performs the final determination as non-defective product. The second control device 160 transmits a determination result such as a determination of a defective product or a non-defective product to the first control device 150, and the first control device 150 determines, based on a received determination result, that the plurality of resin sealing bodies 3 provided in the lead frame 1 are the defective product or the non-defective product.

Next, the first illumination device 110 and the second illumination device 120 will be described. The first illumination device 110 and the second illumination device 120 can use a dome-shaped illumination device, a bar-shaped illumination device, a flat illumination device, a ring-shaped illumination device, an UV illumination device, a coaxial epi-illumination device, etc. The first illumination device 110 and the second illumination device 120 preferably adopt the dome-shaped illumination device or the ring-shaped illumination device. The dome-shaped illumination device can be adopted for the first illumination device 110 and a plurality of bar-shaped illumination devices can be adopted for the second illumination device 120. Alternatively, each of the first illumination device 110 and the second illumination device 120 can be configured by combining the dome-shaped illumination device or the ring-shaped illumination device with the coaxial epi-illumination device. Incidentally, the coaxial epi-illumination device is an illumination for irradiating the top surface or the bottom surface of the plurality of resin sealing bodies 3 to be inspected from an axis along a normal line of the top surface or the bottom surface of the plurality of resin sealing bodies 3 to the top surface or the bottom surface of the plurality of resin sealing bodies 3.

FIG. 1 shows an exemplary configuration in which the dome-shaped illumination device is used as the first illumination device 110 and the second illumination device 120. The first illumination device 110 as the dome-shaped illumination device has a light guide plate 111 having an opening 113 for image capturing at a center portion, and a plurality of light sources 112 arranged in a ring like shape at equal intervals on an inner side of the light guide plate 111 and illuminating the light guide plate 111 from the inner side. Irradiated light from the plurality of light sources 112 is reflected by the light guide plate 111 on an inner reflective surface, and reflected light irradiate the top surface of the plurality of resin sealing bodies 3.

The second illumination device 120 as the dome-shaped illumination device has a light guide plate 121 having an opening 123 for image capturing at the center, and a plurality of light sources 122 arranged in a ring like shape at equal intervals on an inner side of the light guide plate 121 and illuminating the light guide plate 121 from the inner side. The irradiated light from the plurality of light sources 122 is reflected by the light guide plate 121 on an inner reflection surface, and reflected light irradiate the bottom surface of the plurality of resin sealing bodies 3. Each of the plurality of light sources 112 and 122 may comprise light emitting diodes.

When the coaxial epi-illumination device and the dome-shaped illumination devices (110, 120) are used in combination, the light illuminated from the coaxial epi-illumination device is illuminated from the openings 113, 123 to the inspection object. The combined use of the coaxial epi-illumination device and the dome-shaped illumination devices (110, 120) solves double contrasts caused by the openings (113, 123) provided in the dome-shaped illumination devices (110, 120).

In FIG. 1, a distance H3 between an illuminated surface of each of the first illumination device 110 and the top surface of the resin sealing bodies 3, and the second illumination device 120 and the bottom surface of the resin sealing bodies 3 are adjusted such that a portion of the captured image captured by the first imaging device 130 and the second imaging device 140 disappears. That is, an image of the lead frame, provided around the plurality of resin sealing bodies 3 which is the inspection object, disappears in the captured image captured by the first imaging device 130 and the second imaging device 140. More detailed explanation, when the lead frame is illuminated with the first light and the second light, a light diffraction phenomenon occurs due to the lead frame. For this reason, in the captured image captured by the first imaging device 130 and the second imaging device 140, image data of the portion where the lead frame existed cannot be recognized by the light diffraction phenomenon. Therefore, in the captured images captured by the first imaging device 130 and the second imaging device 140, images of the plurality of resin sealing bodies 3, which is the inspection object, are mainly captured.

Since an image of the lead frame is not captured in the captured image captured by the first imaging device 130 and the second imaging device 140, there is no need to consider materials of the lead frame, slits between leads, patterns of the slits provided in the lead frame, a background reflected in the slits, and the like. Therefore, in the image determination using artificial intelligence (AI), it is possible to reduce the number of images as teacher data at the time of a creation of a learning model. In addition, it is possible to improve a correct answer rate of the image determination using artificial intelligence (AI).

Figure 2:
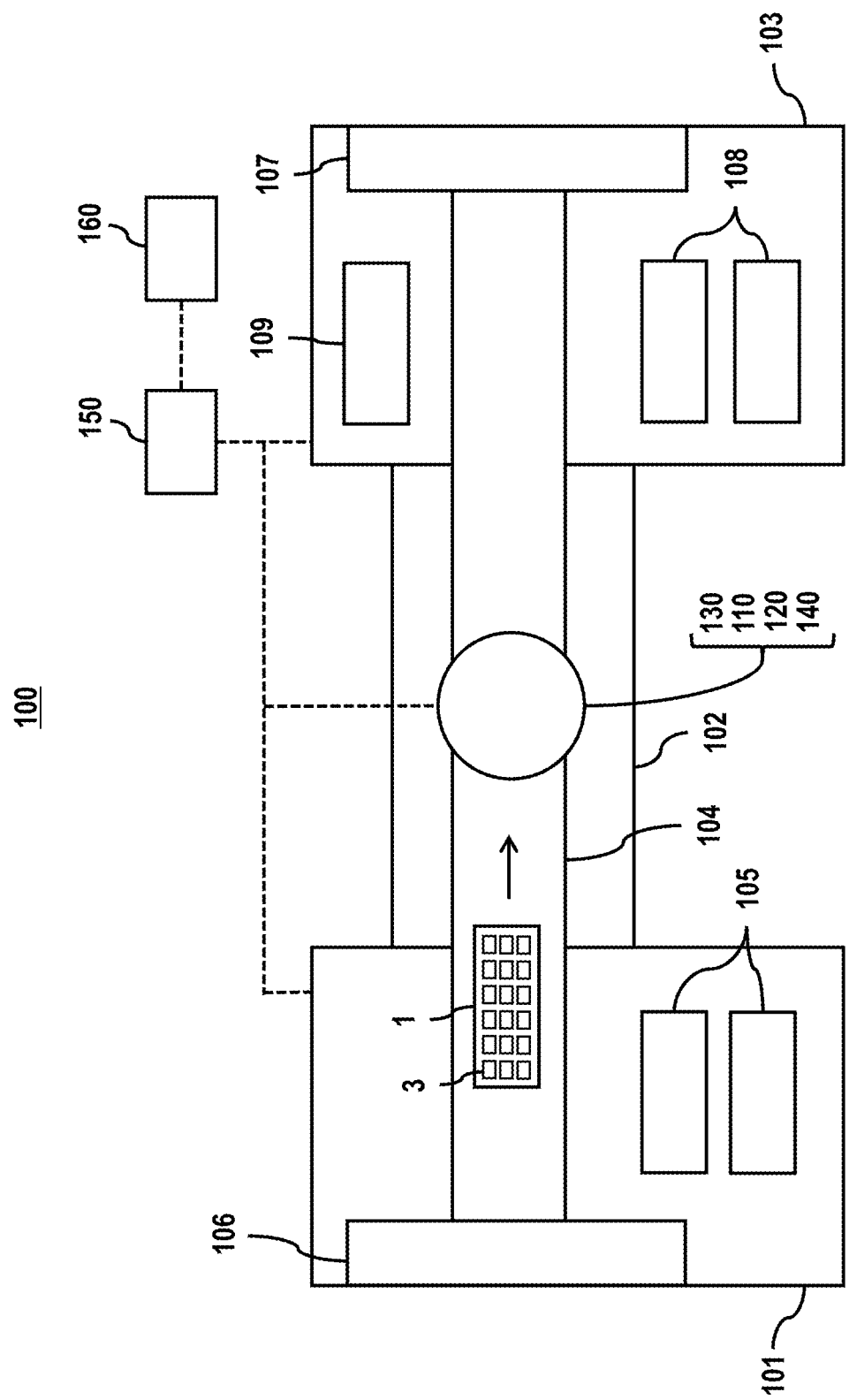
FIG. 2 is a schematic plan view illustrating an exemplary general configuration of the visual inspection device.

FIG. 2 is a schematic plan view illustrating an exemplary general configuration of the visual inspection device. The visual inspection device 100 includes a loader unit 101, an image inspection unit 102, an unloader unit 103, a transfer stage 104, the first control device 150, the second control device 160, and the like.

The loader unit 101 includes storage units 105, a supply pickup unit 106, and the like. The lead frame 1 provided with the plurality of resin sealing bodies 3 before the image inspection is supplied to the plurality of storage units 105. The supply pickup unit 106 places the lead frame 1 supplied to the storage units 105 on the transfer stage 104. The lead frame 1 mounted on the transfer stage 104 is transferred to the image inspection unit 102. The transfer stage 104 can be regarded as a support mechanism capable of supporting the inspection object (the lead frame 1 provided with the plurality of resin sealing bodies 3).

The image inspection unit 102 includes the first illumination device 110, the second illumination device 120, the first imaging device 130, and the second imaging device 140. These are described with reference to FIG. 1. In the image inspection unit 102, an image inspection is performed based on the captured image. When the lead frame 1 is transferred between the first illumination device 110 and the second illumination device 120 by the transfer stage 104, the first illumination device 110 and the second illumination device 120 irradiate the lead frame 1 with the first light and the second light under control of the first control device 150, and the first imaging device 130 and the second imaging device 140 capture the top surface and the bottom surface of the lead frame 1. The two captured images are sent to the first control device 150.

As shown in FIG. 2, the lead frame 1 includes, in an example, 3×6 manner of the resin sealing bodies 3. The first imaging device 130 and the second imaging device 140 perform two imaging operations. In a first image capturing, 3×3 resin sealing bodies 3 positioned on a right side are captured, and two captured images of the top surface and the bottom surface are obtained. Thereafter, the lead frame 1 is moved by the transfer stage 104, and a second image capturing is performed. In the second image capturing, 3×3 resin sealing bodies 3 on the other half of a left side are captured, and two captured images of the top surface and the bottom surface are obtained.

When the image inspection is completed by the image inspection unit 102, the lead frame 1 is transferred to the unloader unit 103 by the transfer stage 104.

The unloader unit 103 includes a storage pickup unit 107, non-defective storage units 108, defective storage unit 109, and the like. When the lead frame 1 for which the image inspection has been completed is judged to be non-defective, the storage pickup unit 107 stores the lead frame 1 in the non-defective storage units 108. When the lead frame 1 for which the image inspection has been completed is determined to be defective, the storage pickup unit 107 stores the lead frame 1 in the defective storage unit 109. The lead frame 1 stored in the non-defective storage units 108 moves to the next step, such as the cutting process of the lead frame.

As described with reference to FIG. 1, the first control device 150 performs image inspection on the transmitted captured image, temporarily determines a defective portion or an abnormal portion of the plurality of resin sealing bodies 3, and transmits the partially captured images (extracted images) corresponding to the defective portion or the abnormal portion to the second control device 160. In addition to the control of the operation described with reference to FIG. 1, the first control device 150 can also control an operation of the supply pickup unit 106, an operation of the transfer stage 104, and an operation of the storage pickup unit 107.

As described with reference to FIG. 1, the second control device 160 performs the image determination using artificial intelligence (AI) on the partially captured images (extracted images) corresponding to the defective portion or the abnormal portion, and transmits a non-defective product determination and a defective product determination to the first control device 150. The first control device 150 can control an operation of the storage pickup unit 107 based on determination results of the non-defective product determination and the defective product determination.

Figure 3:
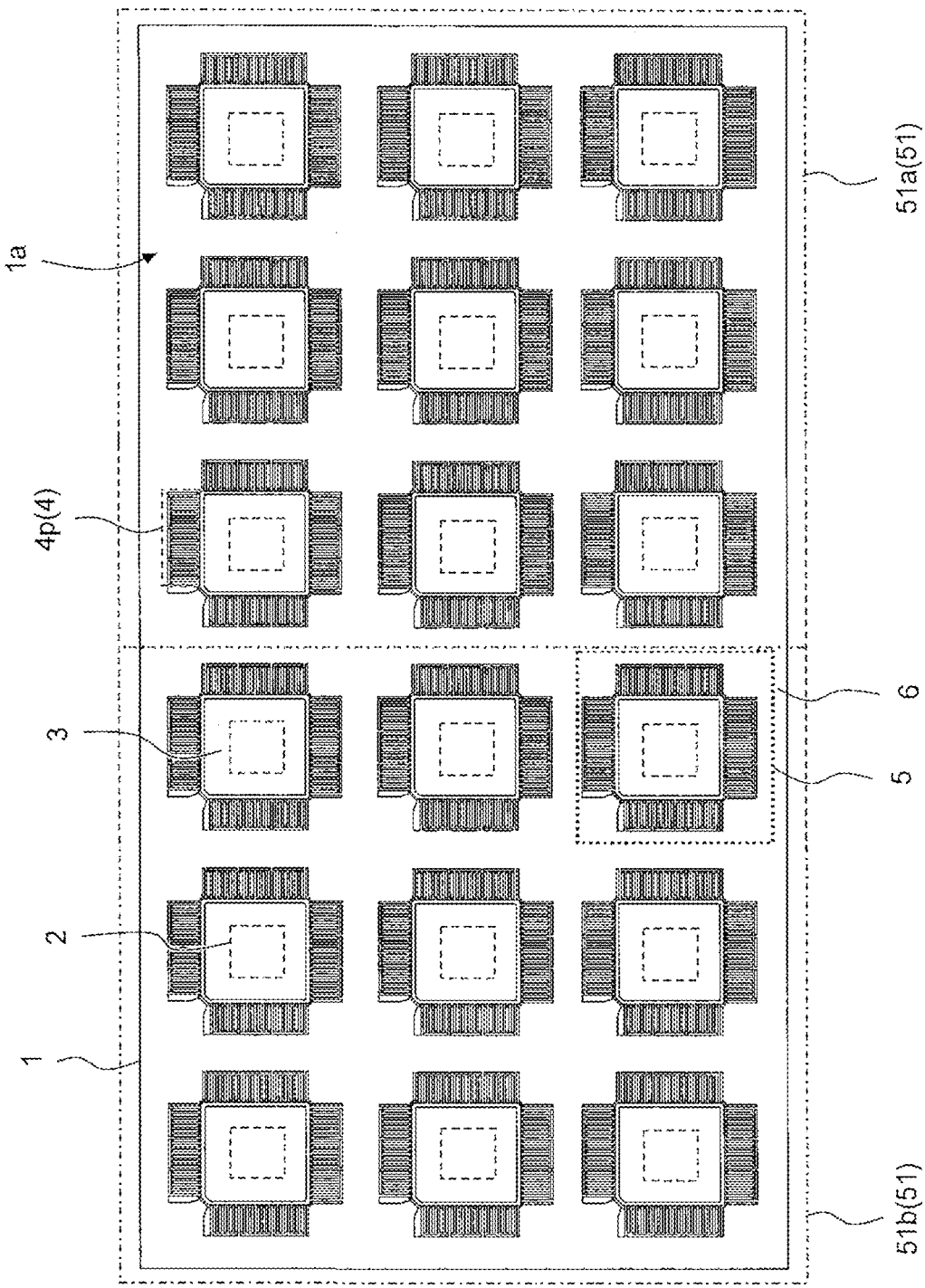
FIG. 3 is a plan view showing an exemplary configuration of a lead frame having a plurality of resin sealing bodies.
Figure 4:
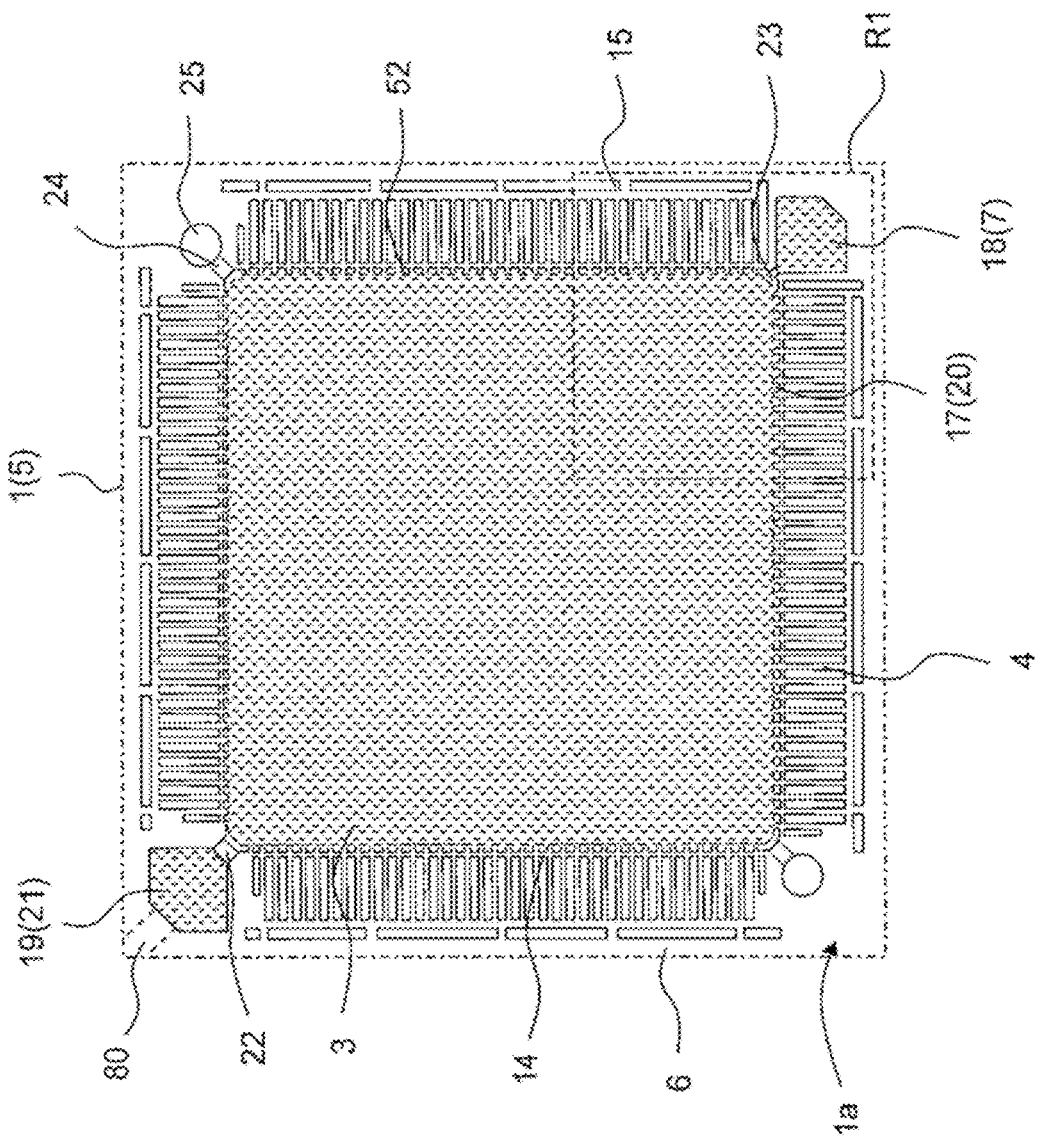
FIG. 4 is an enlarged upper surface diagram showing an exemplary configuration of a unit device region shown in FIG. 3.
Figure 5:
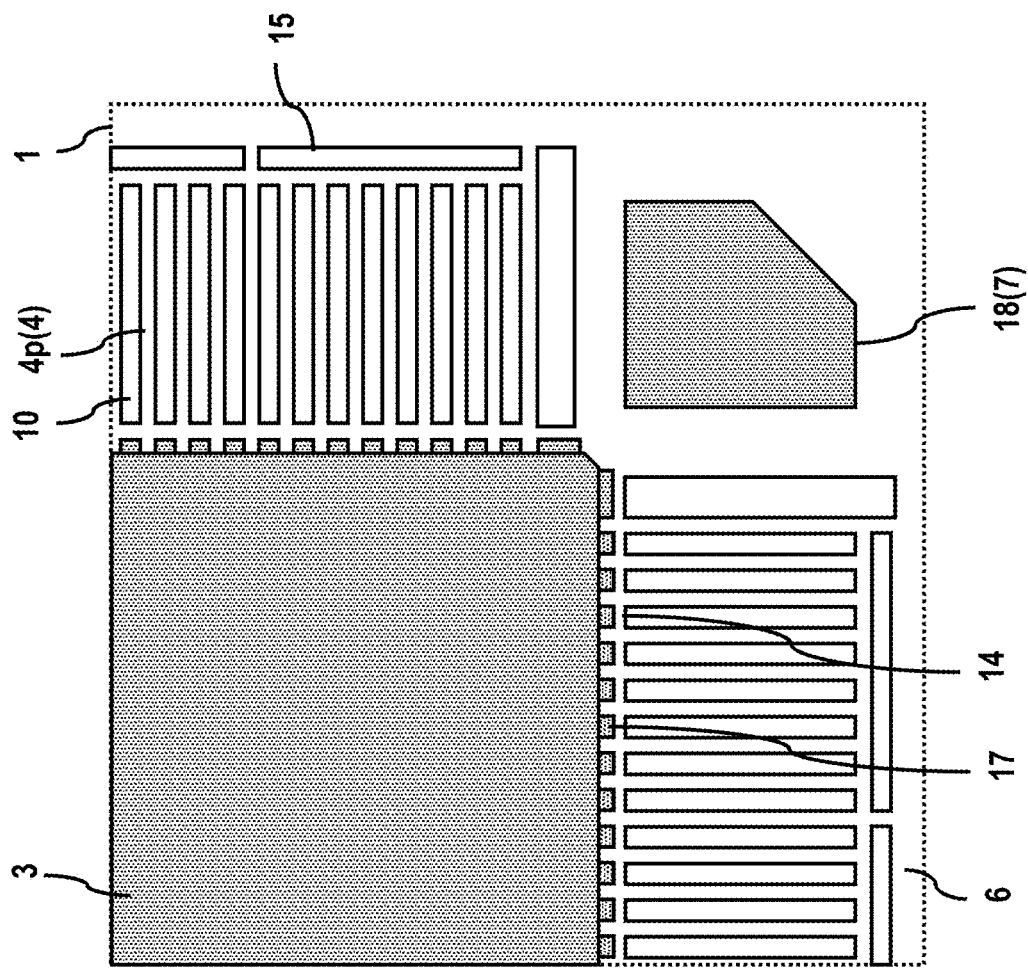
FIG. 5 is an upper surface diagram showing an enlarged configuration of the lead frame in a corner cut-out region of FIG. 4.

Next, a configuration example of the lead frame 1 having the plurality of resin sealing bodies 3 will be described with reference to FIGS. 3 to 5. FIG. 3 is a plan view showing an exemplary configuration of a lead frame having a plurality of resin sealing bodies. FIG. 4 is an enlarged upper surface diagram showing an exemplary configuration of a unit device region shown in FIG. 3. FIG. 5 is an upper surface diagram showing an enlarged configuration of the lead frame in a corner cut-out region of FIG. 4.

As an example, FIG. 3 shows the lead frame 1 with 18 unit device regions 5 arranged in matrix of 3×6 manner, that is, the lead frame 1 made of a metallic material having copper or 42 alloy as a main component, and a complex of the lead frame 1 and a plurality of resin sealing bodies 3 formed in the lead frame 1. Here, the plurality of the unit device regions 5 are integrally held by a frame portion 6, and a semiconductor chip 2 is mounted on a chip mounting surface 1a (in other word, a surface of die pad) of the unit device regions 5 of the lead frame 1. From four sides of the resin sealing bodies 3, a plurality of leads 4, i.e., outer lead portions 4p, are protruded. Though not shown, a plurality of electrode pads (bonding pads) formed on a top surface of the semiconductor chip 2 and the plurality of leads 4 (more precisely, inner lead portions) outside the semiconductor chip 2 are interconnected by bonding wires. That is, the inspection object is the lead frame 1 having a mold region (here, the plurality of resin sealing bodies 3) molded with resin and a lead region including the plurality of leads 4 formed around each of the mold region, and each of the plurality of leads 4 extends in a direction (first direction) orthogonal to each side of the mold region (the plurality of resin sealing bodies 3) and is arranged at equal intervals.

In FIG. 3, unit image capturing areas 51 (51a, 51b) are shown. In the first image capturing, top surface and the bottom surface of the unit image capturing area 51a are captured by the first imaging device 130 and the second imaging device 140, and in the second image capturing, top surface and the bottom surface of the unit image capturing area 51b are captured by the first imaging device 130 and the second imaging device 140.

As shown in FIGS. 4 and 5, in the unit device region 5, the lead frame 1 has a tie bar 14 (in other word, dam bar), a slit 15, a gate opening 21, a flow cavity opening 7, a vent opening 25, and the like. The tie bar 14 connects the plurality of leads 4 to each other around a connecting portion between an inner lead portion (not shown) and an outer lead portion 4p. As shown in FIG. 5, an outer lead opening 10 is provided between neighboring the outer lead portions 4p, and the slits 15 for preventing warping of the entire lead frame 1 are provided on the outer side of the outer lead opening 10. In FIG. 4, for reference, an outer edge of a mold cavity 52 when set in a mold of a transfer mold device is indicated by a broken line.

A flow of the resin to a completion stage of the resin filling in a resin molding process will be described together with an overall structure of the unit device region 5. A resin tablet inserted into a pot of the mold of the transfer mold device is melted by a heat of the mold to form a melted sealing resin, and reach the gate opening 21 of the lead frame 1 through a cull portion and a runner portion 80 of the mold. Next, the resin is injected into the mold cavity 52 (the space formed between a lower mold and an upper mold of the transfer mold device) through an injection gates 22, the mold cavity 52 is gradually filled, and after finally filling the mold cavity 52, lead dam regions 20 are also filled to form tie bar resin bodies 17. Further, at this time, an excess sealing resin is transferred to a flow cavity (not shown) through a flow gate 23 together with the void, and fills the flow cavity (not shown) to form a sealing resin body 18 of the flow cavity opening 7. Similarly, a sealing resin body 19, i.e., a gate resin, is also formed in the runner portion 80 and the gate opening 21 of the lead frame 1. The flow cavity is smaller than the mold cavity 52 formed between the lower mold and the upper mold, and is a space including the flow cavity opening 7 of the lead frame 1.

On the other hand, air vents 24 for exhausting air are usually provided at corners on both sides of a diagonal line connecting the injection gate 22 and the flow gate 23, and corresponding vent openings 25 for accommodating a small amount of resin exhausted together with air are provided in the lead frame 1. In case of normal in the completion stage of the resin filling, the plurality of resin sealing bodies 3 completely covers a front main surface, a back surface, and a die pad of the semiconductor chip 2. However, in some products, the back surface of the chip 2 or the back surface of the die pad is exposed.

Figure 6:
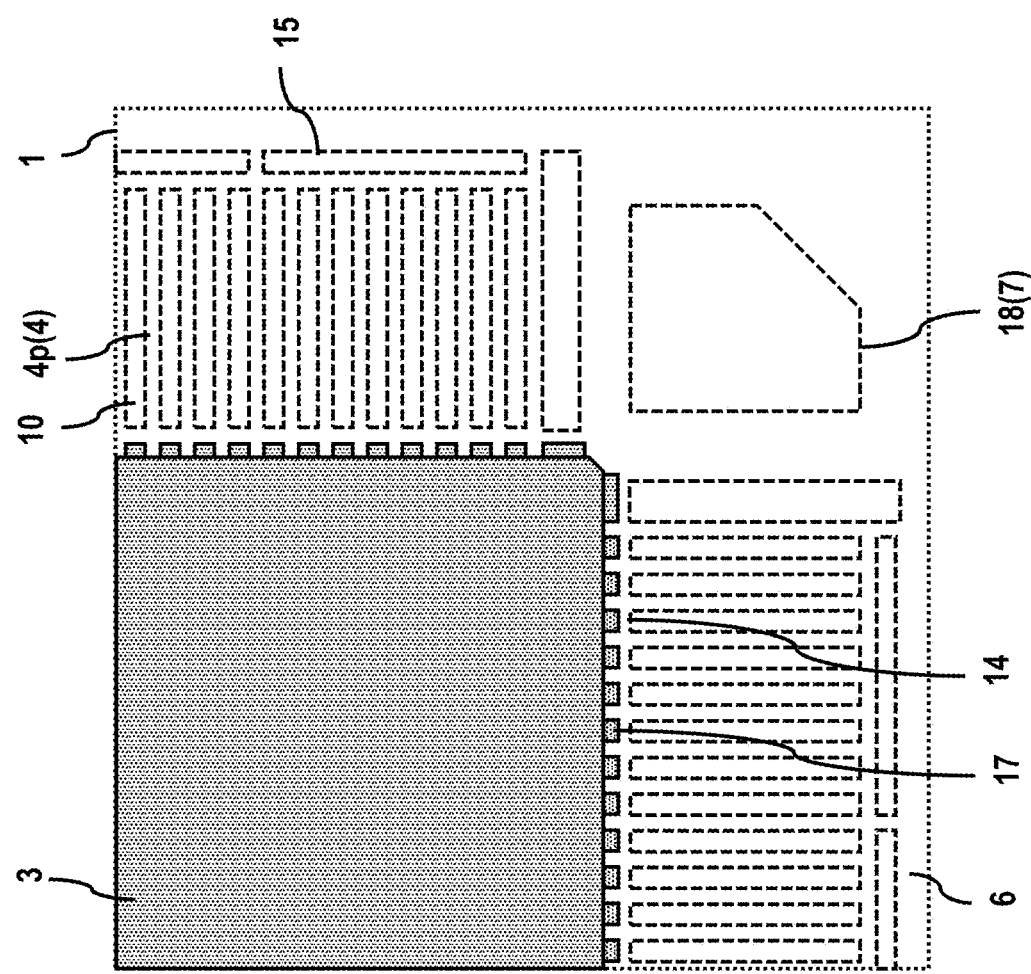
FIG. 6 is a diagram for exemplary explaining of a captured image of the corner cut-out region of FIG. 5 in case where the lead frame is irradiated with a first light and a second light.
Figure 7:
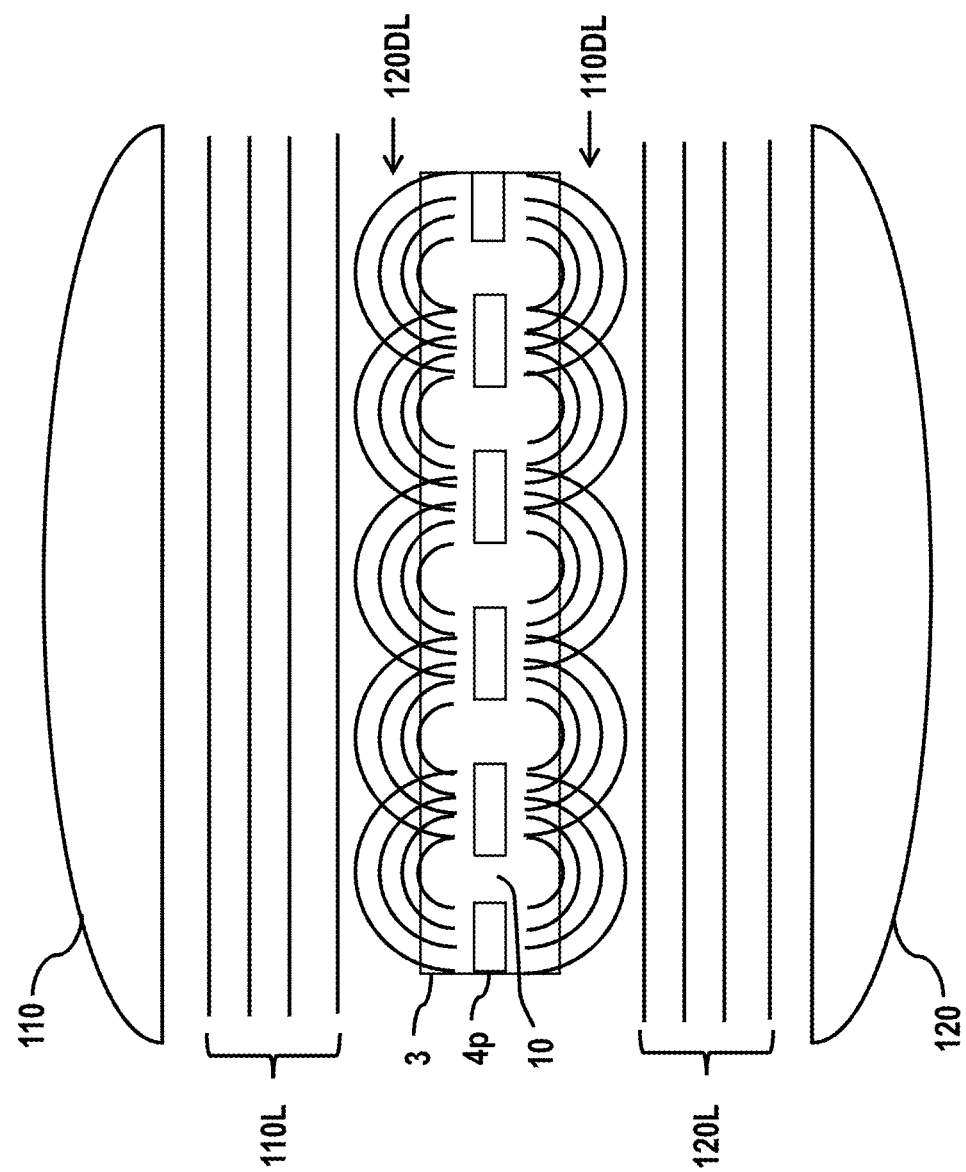
FIG. 7 is a diagram conceptually explaining a diffraction phenomenon of the first light and the second light by the lead frame.

Next, with reference to FIGS. 6 and 7, the captured image of the plurality of resin sealing bodies 3 provided on the lead frame 1 are described. FIG. 6 is a diagram for explaining an example of the captured image of a corner cut-out region R1 of FIG. 4 in the case where the lead frame 1 is illuminated with the first light and the second light. FIG. 7 is a diagram conceptually explaining a diffraction phenomenon of the first light and the second light by the lead frame 1.

FIG. 6 exemplarily shows the captured image of the corner cut-out region R1 in the captured image captured by the first imaging device 130, in which the first light is illuminated from the first illumination device 110 to top surface of the plurality of resin sealing bodies 3 to be inspected and top surface of the lead frame 1, and the second light is illuminated from the second illumination device 120 to the bottom surface of the lead frame 1, which is the opposing surface of top surface of the plurality of resin sealing bodies 3 to be inspected. As shown in FIG. 6, the outer lead portion 4p of the lead frame 1, the tie bar 14, the slits 15, the sealing resin body 18 of the flow cavity opening 7, and the like disappear from the captured image as shown by the dotted line, and the plurality of resin sealing bodies 3 and the tie bar resin bodies are captured as the captured image. Similarly in the captured image captured by the second imaging device 140, the outer lead portion 4p of the lead frame 1, the tie bar 14, the slits 15, the sealing resin body 18 of the flow cavity opening 7, and the like disappear from the captured image as indicated by the dotted line, and the plurality of resin sealing bodies 3 and the tie bar resin bodies 17 are captured as the captured images. As shown in FIG. 7, the outer lead opening 10 and the slits 15 between the outer lead portions 4p constitute a diffraction grating, the first light 110L illuminated from the first illumination device 110 is diffracted by the diffraction phenomenon by the diffraction grating to become the diffracted light 110DL, and the second light 120L illuminated from the second illumination device 120 is diffracted by the light diffraction phenomenon by the diffraction grating to become the diffracted light 120DL. By combining the diffracted light 110DL and the diffracted light 120DL, the image data of the portion of the lead frame 1 where the outer lead portion 4p, the tie bar 14, the slits 15, and the sealing resin body 18 of the flow cavity opening 7 are unrecognized. Therefore, in the captured images captured by the first imaging device 130 and the second imaging device 140, images of the plurality of resin sealing bodies 3 and the tie bar resin bodies 17, which is the inspection object, are mainly captured. To be precise, the corner portion of the tie bar resin bodies 17 is captured in a rounded state by a diffraction phenomenon.

Figure 8:
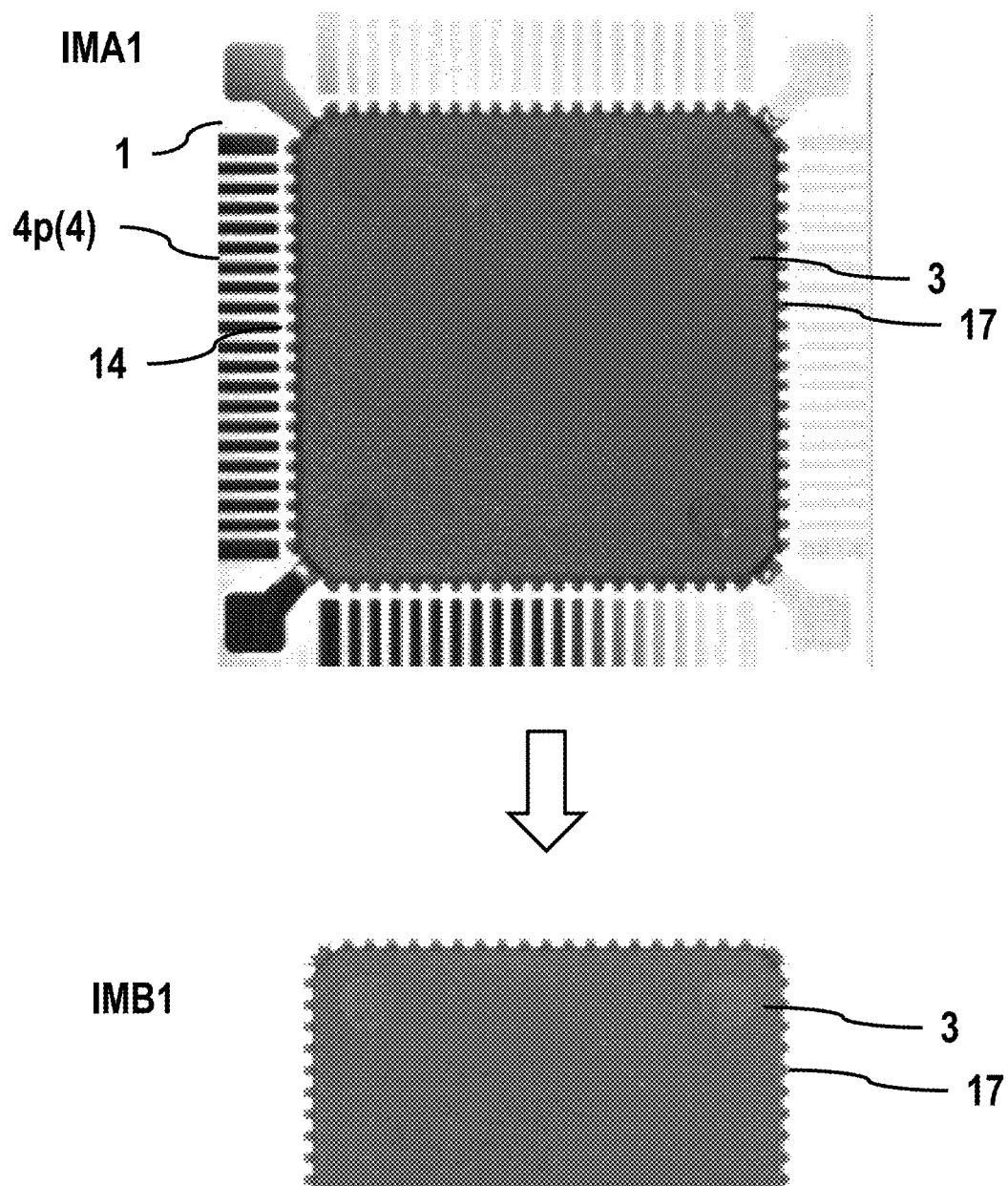
FIG. 8 is a diagram showing examples of captured images captured by a first image capturing device and a second image capturing device.

FIG. 8 is a diagram showing examples of the captured images captured by the first imaging device 130 and the second imaging device 140. A first captured image IMA1 is a comparative example and is a captured image of the first imaging device 130 and the second imaging device 140 when only one of the first illumination device 110 and the second illumination device 120 is illuminated. A second captured image IMB1 is a captured image of the first imaging device 130 and the second imaging device 140 when both the first illumination device 110 and the second illumination device 120 are illuminated. In the first captured image IMA1, images of the plurality of resin sealing bodies 3, the tie bar resin bodies 17, the plurality of resin sealing bodies 3, and the lead frame 1 around the tie bar resin bodies 17 (outer lead portion 4p, tie bar 14) are captured. On the other hand, in the second captured image IMB1, images of the plurality of resin sealing bodies 3 and the tie bar resin bodies 17 are captured, but images of the lead frame 1 (outer lead portion 4p, tie bar 14) around the plurality of resin sealing bodies 3 and the tie bar resin bodies 17 are not captured.

FIG. 9 is a diagram illustrating another exemplary captured image captured by the first imaging device 130 and the second imaging device 140. FIG. 9 shows the captured image in the case where the plurality of resin sealing bodies 3 has a poor-filling portion or an abnormal filling portion as an example. A third captured image IMA2 is a comparative example and is a captured image of the first imaging device 130 and the second imaging device 140 when only one of the first illumination device 110 and the second illumination device 120 is illuminated. A fourth captured image IMB2 is a captured image of the first imaging device 130 and the second imaging device 140 when both the first illumination device 110 and the second illumination device 120 are illuminated. In the third captured image IMA2, compared with the first captured image IMA1, an image of an inner lead portion 4i is also captured in the region of the plurality of resin sealing bodies 3 in a poor-filling 3A. On the other hand, in the fourth captured image IMB2, similarly to the second captured image IMB1, images of the plurality of resin sealing bodies 3 and the tie bar resin bodies 17 are captured, but images of the outer lead portion 4p and the tie bar 14 of the lead frame 1 around the plurality of resin sealing bodies 3 and the tie bar resin bodies 17 and images of the inner lead portion 4i in the region of the poor-filling 3A are not captured.

In the second captured image IMB1 and the fourth captured image IMB2, the plurality of resin sealing bodies 3 periphery as the inspection object is mainly captured, and an image of the lead frame 1 around the plurality of resin sealing bodies 3 (the outer lead portion 4p, the tie bar 14, and the inner lead portion 4i in an area of the poor-filling 3A) is not captured. That is, the lead frame 1 which is not the inspection target is not reflected as the background around the plurality of resin sealing bodies 3 in the images captured when the external inspection of the plurality of resin sealing bodies 3 constituting the packaging surface of semiconductor device is performed. Thus, the captured image suitable for the image determination using artificial intelligence (AI) can be obtained. In addition, it is possible to reduce the number of images as the teacher data at the time of creating the learning model in the image determination using artificial intelligence (AI). Since changes of the background around the plurality of resin sealing bodies 3 are small, it is possible to improve the correct answer rate of the image determination using the artificial intelligence (AI).

Figure 10:
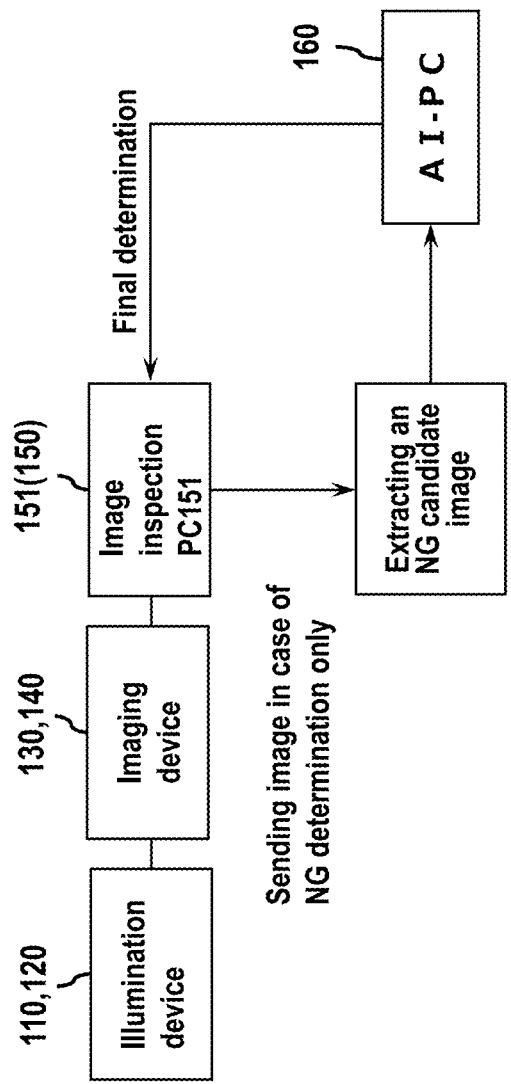
FIG. 10 is a diagram for explaining the operation of the visual inspection device of FIG. 2.

FIG. 10 is a diagram for explaining an operation of the visual inspection device 100 of FIG. 2. The first control device 150 includes an image inspection PC151, and the image inspection PC151 is coupled to the first illumination device 110, the second illumination device 120, the first imaging device 130, and the second imaging device 140 to control their functions and operations.

In the image inspection PC151, the first illumination device 110 and the second illumination device 120 are illuminated, and top surface and the bottom surface of the plurality of resin sealing bodies 3 provided in the lead frame 1 are captured by the first imaging device 130 and the second imaging device 140. The image inspection PC151 is configured to input the captured images captured by the first imaging device 130 and the second imaging device 140, respectively, and to perform visual inspection of the plurality of resin sealing bodies 3 provided on the lead frame 1 based on the inputted captured images. When it is recognized that the plurality of resin sealing bodies 3 have a defective portion or an abnormal portion as in a NG case, the image inspection PC151 extracts or cuts out an image (NG candidate image) corresponding to a defect candidate portion or the abnormal candidate portion from the captured images, and transmits one or a plurality of extracted images (NG candidate images) thus cut out to a second control device (AI-PC) 160. On the other hand, when it is judging that there is no defective portion or abnormal portion in the resin sealing body 3 (OK judgement), the image inspection PC151 determines that the plurality of resin sealing bodies 3 provided in the lead frame 1 are non-defective.

The second control device 160 is configured to input one or a plurality of extracted images (NG candidate images) and perform the image determination using artificial intelligence (AI) on the input one or a plurality of NG candidate images. The second control device 160 makes a final judgement as to whether the transmitted the NG candidate images are a non-defective product or a defective product by the learned models, and transmits the result of the final judgement to the image inspection PC151. Based on the result of the final judgement transmitted from the second control device 160, the image inspection PC151 determines whether the plurality of resin sealing bodies 3 provided in the lead frame 1 are non-defective or defective.

Figure 11:
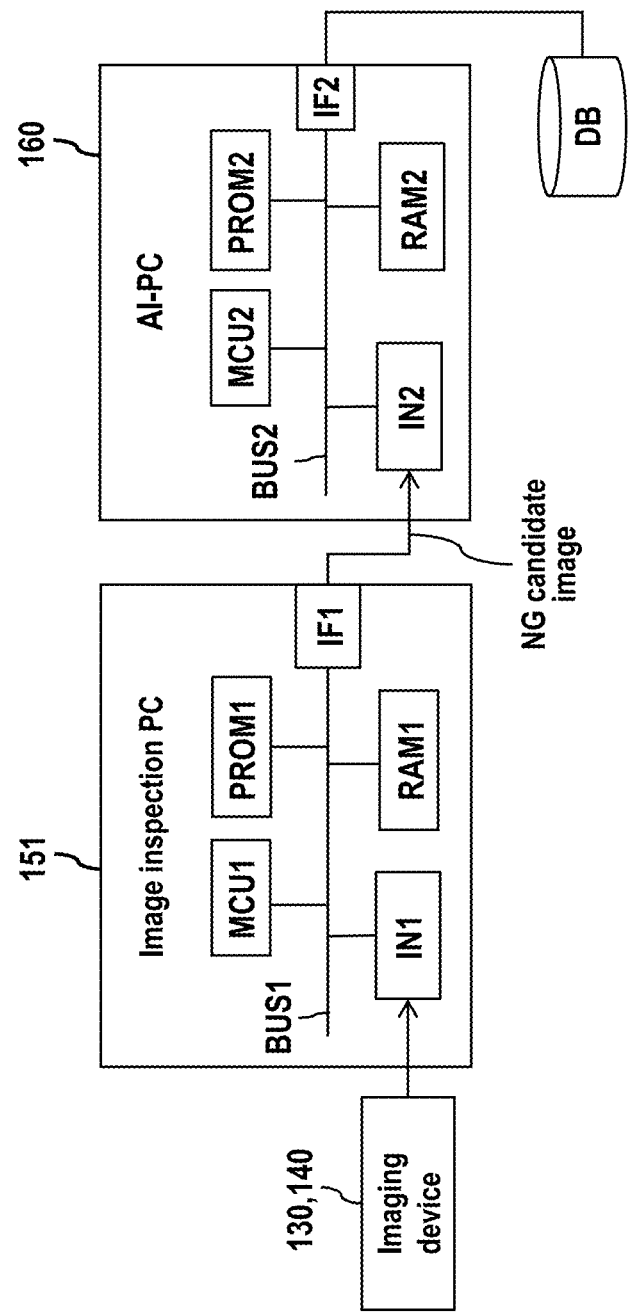
FIG. 11 is a conceptual diagram showing an exemplary configuration of a first control device and a second control device.

FIG. 11 is a conceptual diagram showing an exemplary configuration of a first control device and a second control device. A first control device 151 includes a computer MCU1, a nonvolatile memory PROM1, a volatile memory RAM1, an input circuit IN1, an interface IF1, and a bus BUS1 for interconnecting these circuits (MCU1, PROM1, RAM1, IN1, IF1). The input circuit IN1 receive the captured images captured by the first imaging device 130 and the second imaging device 140, respectively. This captured image can be regarded as the multi-tone inspected image data obtained from the inspection object, i.e., the plurality of resin sealing bodies 3 provided on the lead frame 1. The nonvolatile memory PROM1 stores programs executed by the computer MCU1. The volatile memory RAM1 is used as a temporary storage area for arithmetic data or the like of the computer MCU1. The computer MCU1 executes programs stored in the nonvolatile memory PROM1, and performs image inspection of captured images. When the computer MCU1 determines that the plurality of resin sealing bodies 3 have a defective portion or an abnormal portion, it extracts or cuts out an image (NG candidate images) corresponding to the defective candidate portion or the abnormal candidate portion from the captured image, and transmits the cut out one or a plurality of extracted images (NG candidate images) to the second control device (AI-PC) 160 via the interface IF1. On the other hand, when the computer MCU1 judges that there is no defective candidate portion or abnormal candidate portion in the plurality of resin sealing bodies 3, it determines that the plurality of resin sealing bodies 3 provided in the lead frame 1 are non-defective. The size of the NG candidate images is a size suitable for the image determination using artificial intelligence (AI), for example, 256×256 pixels (resolution: 25 μm/pixel).

The second control device (AI-PC) 160 includes a computer MCU2, a non-volatile memory PROM2, a volatile memory RAM2, an input circuit IN2, an interface IF2, and a bus BUS2 interconnecting these circuits (MCU2, PROM2, RAM2, IN2, IF2). The non-volatile memory PROM2 stores programs executed by the computer MCU2. The volatile memory RAM2 is used as a temporary storage area for arithmetic data or the like of the computer MCU2. One or a plurality of extracted images (NG candidate images) transmitted from the image inspection PC151 are input to the input circuit IN2. The interface IF2 is coupled to a database DB. The database DB stores a plurality of learned models corresponding to types of semiconductor device packages.

The computer MCU2 executes programs stored in the non-volatile memory PROM2, and performs the image determination using artificial intelligence (AI) on one or a plurality of NG candidate images. The computer MCU2 makes a final determination as to whether the transmitted NG candidate images are a non-defective product or a defective product based on the inputted NG candidate images and the learned models, and transmits the result of the final determination to the computer MCU1. Based on the result of the final determination transmitted from the computer MCU2, the computer MCU1 determines whether the plurality of resin sealing bodies 3 provided in the lead frame 1 are non-defective or defective.

Figure 12:
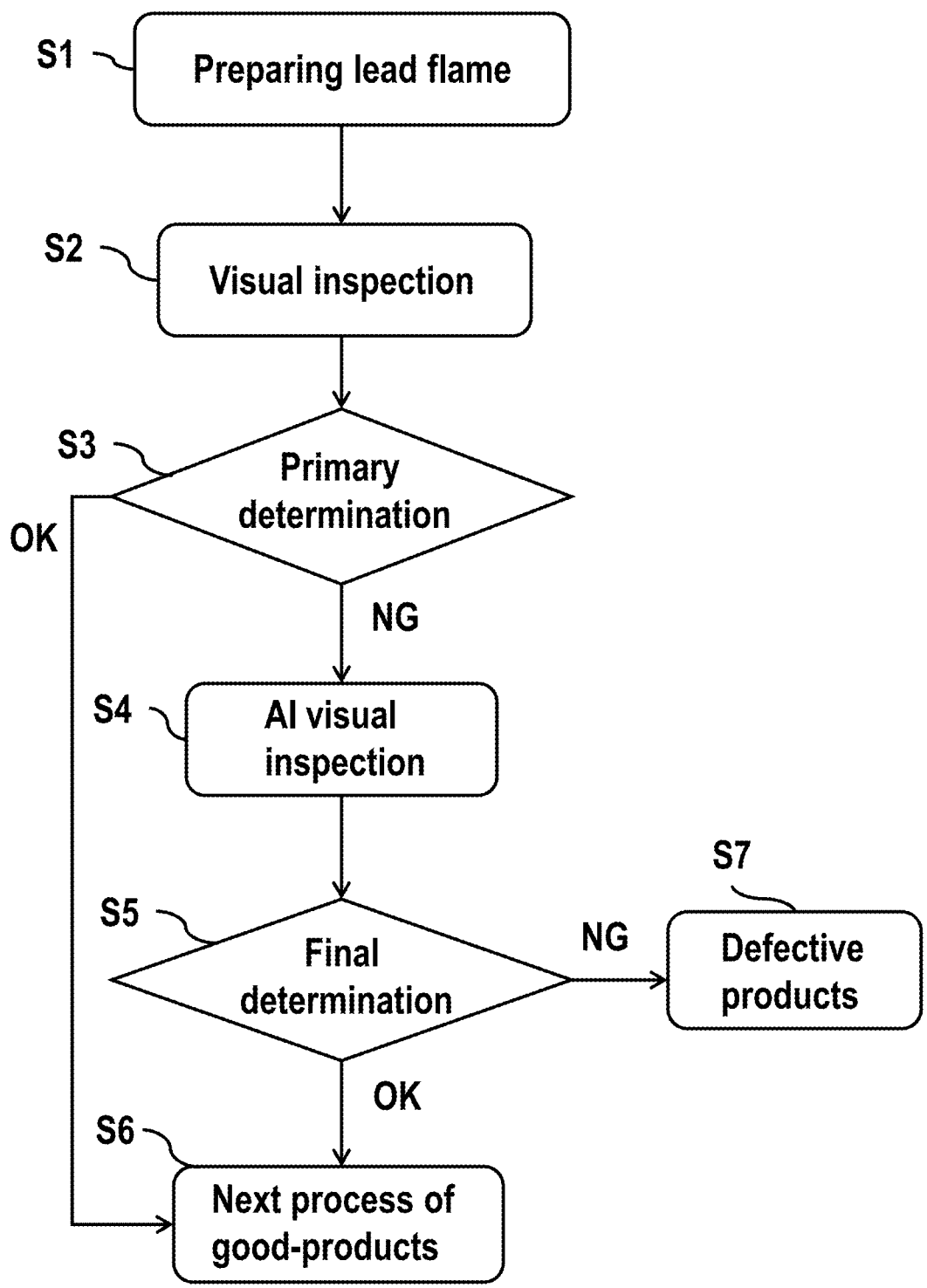
FIG. 12 is a flow chart showing a manufacturing method of the semiconductor device.

Next, manufacturing method of semiconductor device will be described with reference to FIG. 12. FIG. 12 is a flow chart showing manufacturing method of semiconductor device.

(Step S1: Lead Frame Preparation)

First, the lead frame 1 (see FIG. 3) provided with the plurality of resin sealing bodies 3 (inspection object) is prepared. The prepared lead frame 1 is transferred to the image inspection unit 102 by the transfer stage 104 of the visual inspection device 100 and is disposed between the first illumination device 110 and the second illumination device 120 of the image inspection unit 102.

(Step S2: Visual Inspection)

Next, visual inspection of the object is performed by the image inspection PC151. With the first illumination device 110 illuminating the first light and the second illumination device 120 illuminating the second light, the captured images (first captured image, second captured image) of the first imaging device 130 and the second imaging device 140, respectively, are inputted into the image inspection PC151. That is, the image inspection PC151 performs the visual inspection of the inspection object (the plurality of resin sealing bodies 3) based on the captured image obtained from the lead frame 1 prepared as the inspection object. The first captured image is a captured image obtained by image capturing top surface of the lead frame 1, and the second captured image is a captured image obtained by image capturing bottom surface of the lead frame 1.

When the lead frame 1 is made of a metal material containing copper as a main component, an illuminance of the first light and the second light are set to, for example, a range of 10,360 lux or more and 10,560 lux or less, more preferably, about 10,460 lux or less. Further, when the lead frame 1 is a metal material mainly composed of 42 alloy, an illuminance of the first light and the second light are set to a range of 8,750 lux or more and 8,950 lux or less, more preferably, about 8,850 lux, for example.

(Step S3: Primary Determination)

Next, a visual inspection determination is performed by the image inspection PC151. When it is primary determined that there is no defective portion or abnormal portion in all of the plurality of resin sealing bodies 3 provided in the lead frame 1 (that is, there have no NG candidate), the process proceeds to step S6. When it is determined that a defective portion or an abnormal portion exists in a part of the plurality of resin sealing bodies 3 provided in the lead frame 1 (that is, there have NG candidate), the process proceeds to step S4. At this time, the image inspection PC151 extracts or cuts out an image (NG candidate images) corresponding to a defective portion or an abnormal portion, and transmits one or a plurality of extracted images (NG candidate images) extracted or cut out to the second control device (AI-PC) 160.

(Step S4: AI Visual Inspection)

Next, a visual inspection using artificial intelligence (AI visual inspection) is performed by the second control device 160. The second control device 160 performs a visual inspection of the one or a plurality of extracted images based on the one or a plurality of extracted images and the learned models stored in the databases. The second control device 160 performs the determination of the presence or absence of a defective portion or an abnormal portion based on the visual inspection of the one or a plurality of extracted images and transmits the determination result to the image inspection PC151.

(Step S5: Final Determination)

Next, the image inspection PC151 performs a final determination based on the determination result transmitted from the second control device 160. In the case of the final determination indicating that there is no defective portion or abnormal portion, the process proceeds to step S6. On the other hand, in the case of a final determination indicating that there is a defective portion or an abnormal portion. In the case, the process proceeds to step S7.

(Step S6: Next Process of Good-Products)

In response to the determination that all of the plurality of resin sealing bodies 3 provided in the lead frame 1 are non-defective, the lead frame 1 having the plurality of resin sealing bodies 3 shifts to the next process. Here, the following processes include, for example, a process of plating metal on the outer lead portion 4p, a cutting process of cutting the tie bar 14 and the outer lead portion 4p from the frame portion 6, a process of forming the outer lead portion 4p, a semiconductor device electric test process, and a shipping test process of semiconductor device.

(Step S7: Next Process of Defective Products)

In response to the determination that there is a defective portion or an abnormal portion in a part of the plurality of resin sealing bodies 3 provided in the lead frame 1, the lead frame 1 having the plurality of resin sealing bodies 3 is determined as a defective product.

Figure 13:
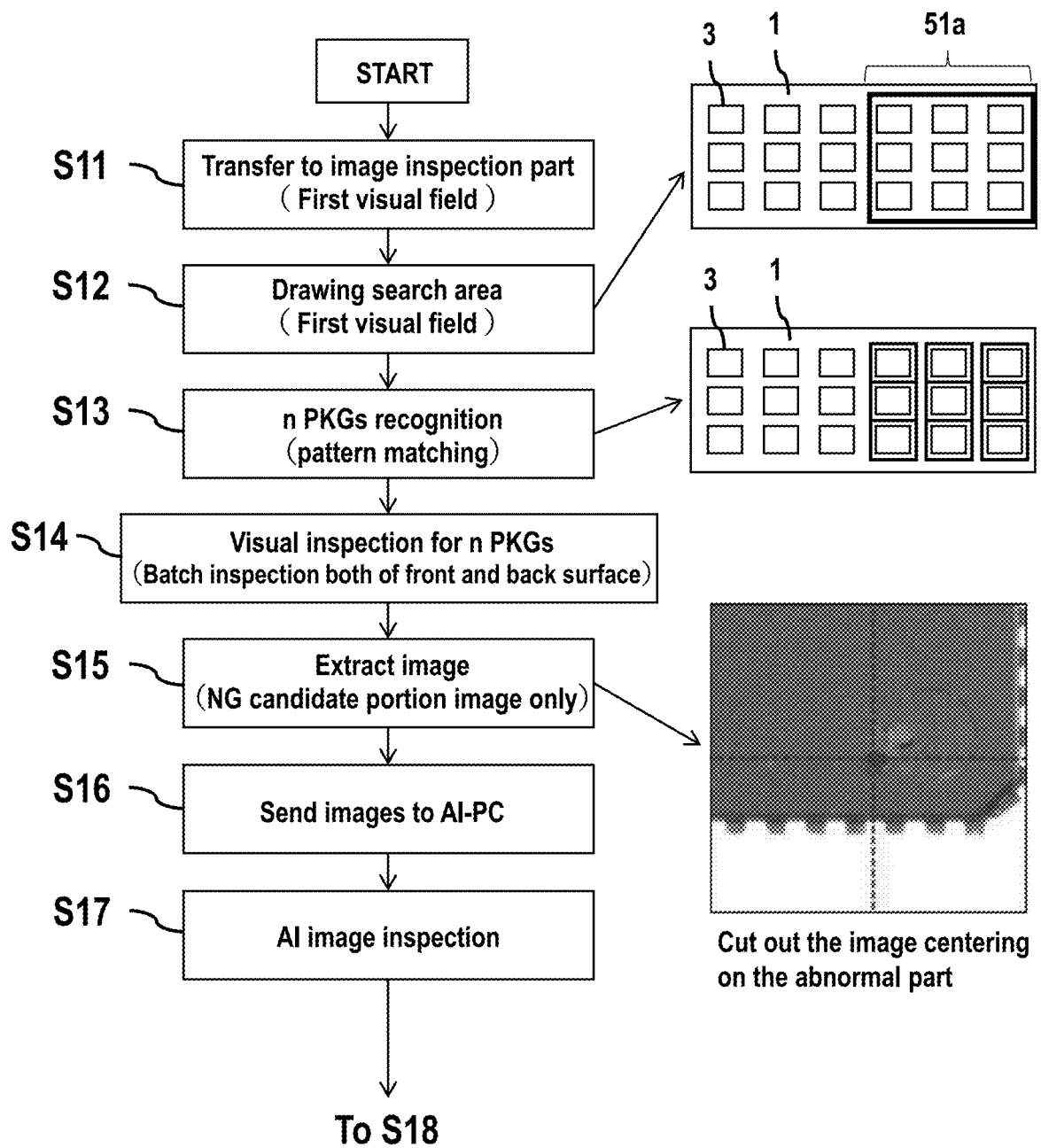
FIG. 13 is a flowchart showing an image inspection method of a captured image by a first photography.
Figure 14:
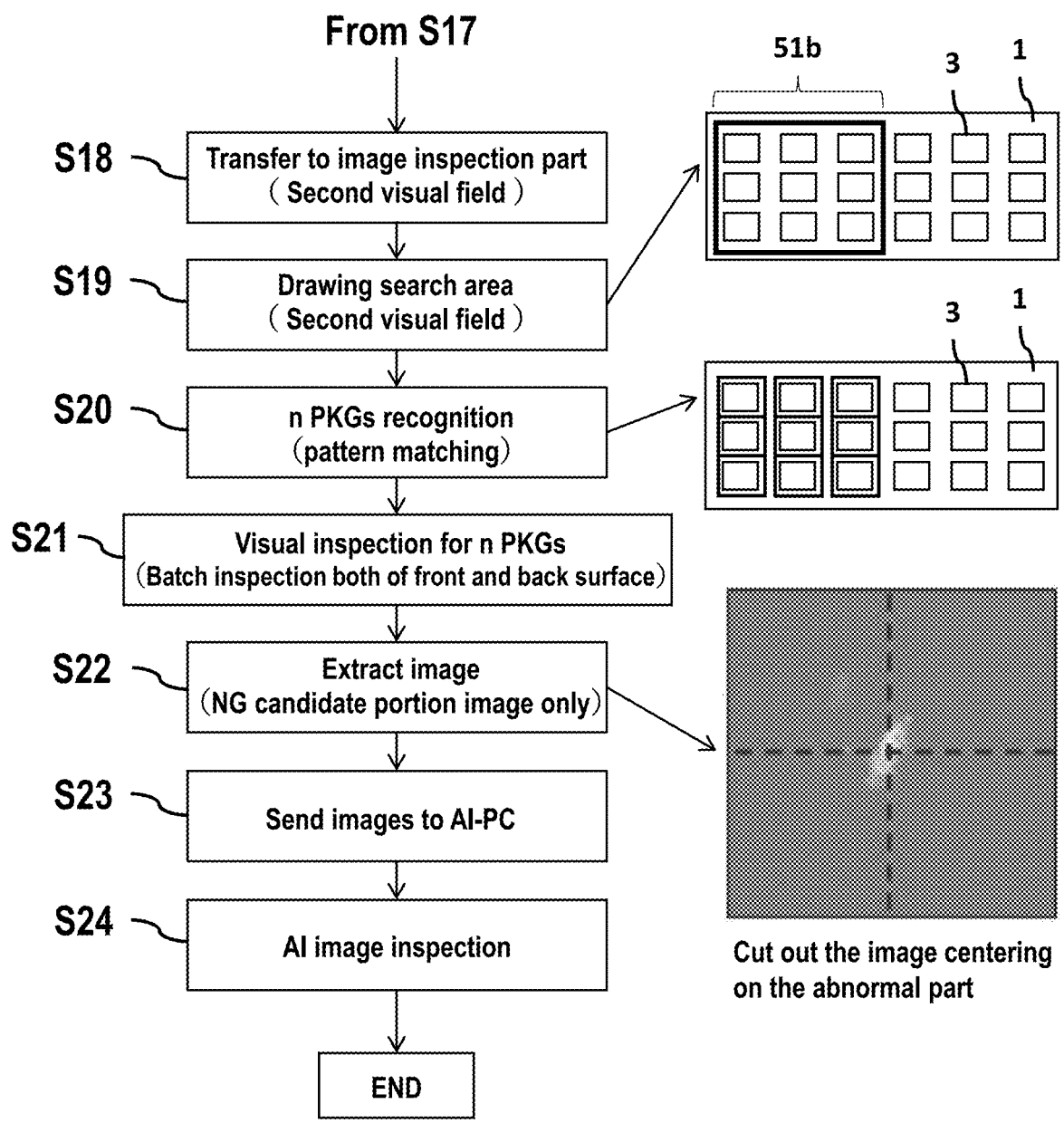
FIG. 14 is a flowchart showing the image inspection method of the captured image by a second photography performed after FIG. 13.

Next, an image inspection method of the lead frame 1 shown in FIG. 3 will be described in more detail with reference to FIGS. 13 and 14. FIGS. 13 and 14 show examples of image inspection method when the visual inspection device 100 shown in FIG. 2 is used to execute steps S2 to S7 in FIG. 12. FIG. 13 is a flowchart showing an image inspection method of the captured image by the first photography. FIG. 14 is a flowchart showing an image inspection method of the captured image by the second photography performed after FIG. 13.

As shown in FIG. 3, the unit image capturing area 51a and the unit image capturing area 51b are set in the lead frame 1. The unit image capturing area 51a is a first image capturing area, and the unit image capturing area 51b is a second image capturing area. In the first image capturing, the top surface and the bottom surface of the unit image capturing area 51a are captured by the first imaging device 130 and the second imaging device 140, and two capturing images (the first captured image and the second captured image) of top surface and the bottom surface are obtained. On the basis of the two captured images thus obtained, top surface and bottom surfaces of the 9 resin sealing bodies 3 in the 9 unit device regions 5 included in the unit image capturing area 51a are inspected. Thereafter, the lead frame 1 is moved by the transfer stage 104, and image capturing of the unit image capturing area 51b (referred to as second image capturing) is performed. In the second image capturing, top surface and the bottom surface of the unit image capturing area 51b are imaged by the first imaging device 130 and the second imaging device 140, and two images of top surface and the bottom surface are obtained. On the basis of the two captured images thus obtained, top surface and bottom surfaces of the 9 resin sealing bodies 3 in the 9 unit device regions 5 included in the unit image capturing area 51b are inspected. It is assumed that top surface and the bottom surface of the unit image capturing areas 51a and 51b are illuminated with the first light from the first illumination device 110 and the second light from the second illumination device 120 at the time of each of the first image capturing and the second image capturing.

In the following description, a first visual field indicates the operation related to the first image capturing, and a second visual field indicates the operation related to the second image capturing. Also, PKG shows package of semiconductor device, where n is 9 in this example.

(Step S11: Transfer to an Image Inspection Part (First Visual Field))

The lead frame 1 (see FIG. 3) provided with the plurality of resin sealing bodies 3, which is the inspection object, is transferred to the image inspection unit 102 by the transfer stage 104 of the visual inspection device 100, and the unit image capturing area 51a of the lead frame 1 is disposed between the first illumination device 110 and the second illumination device 120 of the image inspection unit 102. Then, top surface and the bottom surface of the unit image capturing area 51a are captured by the first imaging device 130 and the second imaging device 140 (first image capturing).

(Step S12: Drawing Search Area (First Visual Field))

The image inspection PC151 has a display device (not shown) and is capable of displaying a captured image of the first imaging device 130 or the second imaging device 140 on the display device. Here, for example, an examination area is drawn in a captured image captured by the first imaging device 130. In this example, the search area is drawn so as to surround the n resin sealing bodies 3. Similarly, a search area may be drawn in the captured image captured by the second imaging device 140.

(Step S13: n PKGs Recognition)

The shapes of n resin sealing bodies 3 included in the search area are recognized by the image inspection PC151. More specifically, shapes of semiconductor device packages are recognized by pattern matching. In the same manner, the shapes of the 9 resin sealing bodies 3 may be recognized by pattern matching in the search area of the captured image captured by the second imaging device 140. By recognizing the shape of each of the n resin sealing bodies 3 by pattern matching, a type of the package (PKG) can be relatively accurately recognized. For example, even if the resin is not filled in one resin sealing body 3 among the n resin sealing bodies 3, if the resin is not filled in the other resin sealing bodies 3, the type of the package (PKG) can be accurately recognized by recognizing the shape of each of the other resin sealing bodies 3.

(Step S14: Visual Inspection for n PKGs)

The respective captured images of top surface (front surface) and the bottom surface (back surface) of each of the n resin sealing bodies 3 are collectively inspected. The image inspection PC151 refers to the information of the shapes of the packages of semiconductor device recognized in the step S13, and examines the external appearance of each resin sealing bodies 3 with respect to each of the captured images of top surface and the bottom surface of each of the n resin sealing bodies 3. When it is determined that any one of the n resin sealing bodies 3 has a defective portion or an abnormal portion, NG candidate judgement is performed, which corresponds to NG candidate judgement in step S3. When it is determined that there is no defective portion or abnormal portion in any of the n resin sealing bodies 3, an OK judgement is performed, which corresponds to the OK judgement in step S3.

(Step S15: Extract Image)

The image inspection PC151 extracts or cuts out an image (NG candidate portion image) corresponding to the defective portion or the abnormal portion so that the defective portion or the abnormal portion becomes the central of one or a plurality of captured images determined as NG in step S14 (corresponding to NG candidate judgement in step S3).

(Step S16: Send Images to AI-PC)

In step S15, one or a plurality of extracted images (NG candidate images) extracted or cut out are transmitted to the second control device (AI-PC) 160.

(Step S17: AI Image Inspection)

The second control device (AI-PC) 160 performs visual inspection using artificial intelligence (AI) based on the one or more extracted images and the learned models stored in the database DB (step S4). The second control device 160 performs a final determination (NG determination, OK determination) as to the presence or absence of a defective portion or an abnormal portion (step S5). Then, the determination result is transmitted to the image inspection PC151. The image inspection PC151 processes the plurality of resin sealing bodies 3 corresponding to the extracted image determined NG determination as a defective product (It is corresponds to step S6). On the other hand, in the event of an OK determination, the image inspection PC151 performs a process of rewriting the plurality of resin sealing bodies 3 corresponding to the extracted image determined as an OK determination from a defective resin to a non-defective resin (It is corresponds to step S7). Thus, the visual inspection of the unit image capturing area 51*a* is completed.

(Step S18: Transfer to the Image Inspection Part (Second Visual Field))

Next, the unit image capturing area 51*b* of the lead frame 1 is disposed between the first illumination device 110 and the second illumination device 120 of the image inspection unit 102 by the transfer stage 104, and top surface and the bottom surface of the unit image capturing area 51*b* are imaged by the first imaging device 130 and the second imaging device 140 (second imaging).

(Step S19: Drawing Search Area (Second Visual Field))

In step S19, since the same operation as that in step S12 is performed, a duplicated description is omitted.

(Step S20: n PKGs Recognition)

In step S20, since the same operation as that in step S13 is performed, a duplicated description is omitted.

(Step S21: Visual Inspection for n PKGs)

In step S21, since the same operation as that in step S14 is performed, a duplicated description is omitted.

(Step S22: Extract Image)

In step S22, since the same operation as that in step S15 is performed, a duplicated description is omitted.

(Step S23: Send Images to AI-PC)

In step S23, since the same operation as that in step S16 is performed, a duplicated description is omitted.

(Step S24: AI Image Inspection)

In step S24, since the same operation as that in step S16 is performed, a duplicated description is omitted. As described above, the visual inspection of the unit image capturing area 51*b* is completed, and the automatic visual inspection of the lead frame 1 as a whole is completed.

Figure 15:
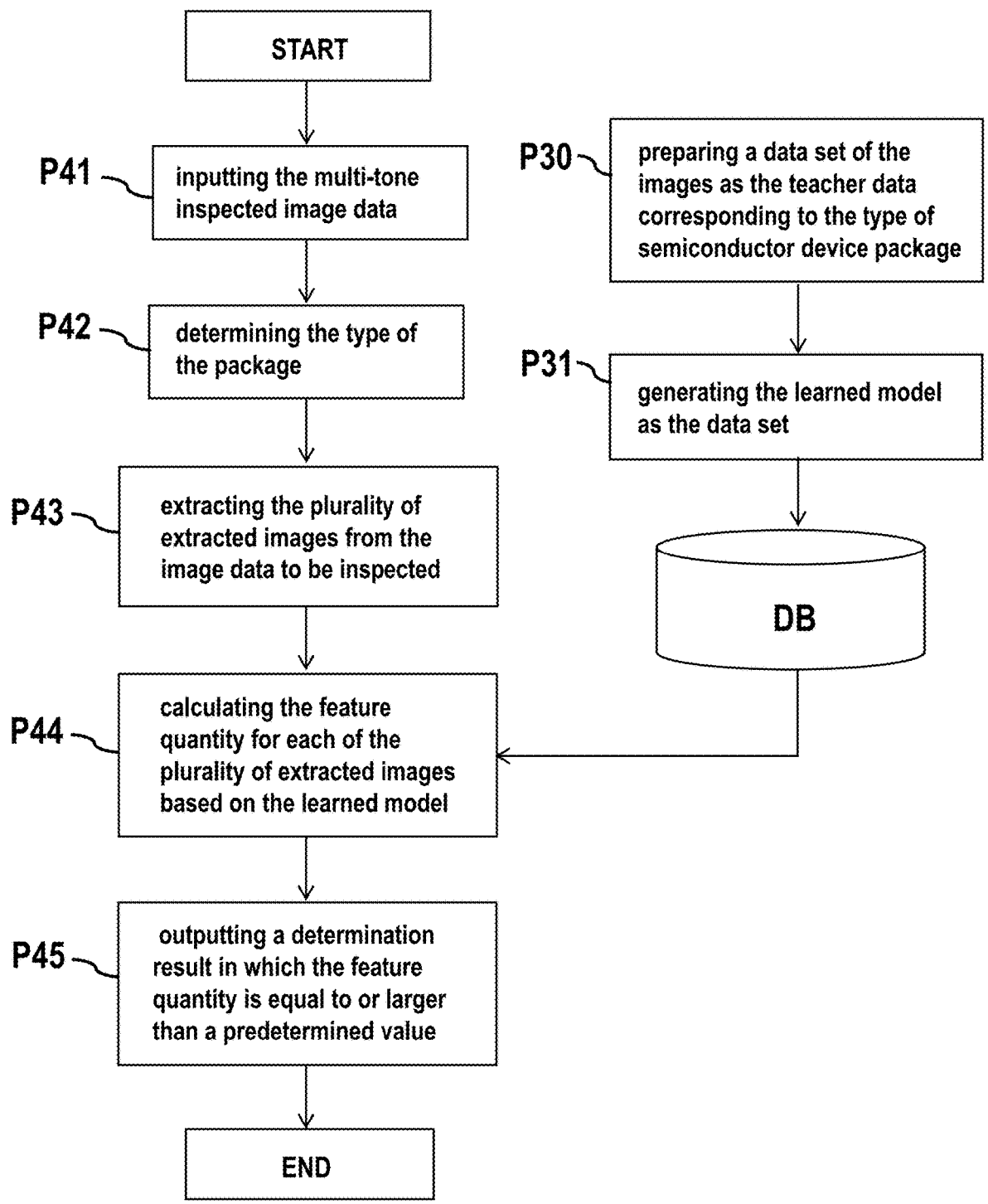
FIG. 15 is a diagram for explaining according to a control program of the visual inspection device.

Next, according to a control program of the visual inspection device 100 is described with reference to FIG. 15. Here, it is assumed that the control program is stored in the nonvolatile memory PROM1, PROM2 of FIG. 11 and executed by the computer MCU1, MCU2. FIG. 15 is a diagram for explaining according to control program of visual inspection device.

The control program includes a procedure for preparing the database DB and a procedure for controlling the image test.

The procedure for preparing the database DB includes a procedure P30 and a procedure P31.

Procedure P30 is a procedure for preparing a data set of the images as the teacher data corresponding to the type of semiconductor device package.

The procedure P31 is a procedure for generating the learned model in which the data set prepared by the procedure P30 is learned as learning data, and storing the learned model in the database DB.

The procedure for controlling the image inspection includes a procedure P41, a procedure P42, a procedure P43, a procedure P44, and a procedure P45.

The procedure P41 is a procedure for inputting the multi-tone inspected image data (captured image) obtained from the inspection object. The procedure P41 is a procedure for causing the computer MCU1 to execute the step S11 of FIG. 13 or the step S18 of FIG. 14.

The procedure P42 is a procedure for determining the type of the package (PKG) of the corresponding semiconductor device from the image data to be inspected inputted by the procedure P41. The procedure P42 is a procedure for causing the computer MCU1 to execute steps S12 and S13 in FIG. 13 and steps S19 and S20 in FIG. 14.

The procedure P43 is a procedure for extracting the plurality of extracted images from the image data to be inspected. The procedure P43 is a procedure for causing the computer MCU1 to execute the steps S14 and S15 in FIG. 13 and the steps S21 and S22 in FIG. 14.

Step P44 is a procedure for extracting the learned model of the type of packages of the corresponding semiconductor device stored in the database DB based on the determination result of the type of packages of semiconductor device in step P42 and calculating the feature quantity for each of the plurality of extracted images based on the learned model. Procedure P44 is a procedure for causing the computer MCU2 to execute step S17 in FIG. 13 and step S23 in FIG. 14.

The procedure P45 is a procedure for outputting a determination result (here, NG determination) of an image in which the feature quantity is equal to or larger than a predetermined value from the plurality of extracted images as a result of calculation of the feature quantity in the procedure P44. Procedure P45 is a procedure for causing the computer MCU2 to execute step S17 in FIG. 13 and step S23 in FIG. 14.

Note that the procedure P45 can include a procedure of outputting an OK determination as a determination result for an image whose feature quantity is lower than a predetermined value, a procedure of transmitting an NG determination and an OK determination to the image inspection PC151, a procedure of processing the plurality of resin sealing bodies 3 corresponding to the extracted image determined as a defective product, and a procedure of rewriting the plurality of resin sealing bodies 3 corresponding to the extracted image determined as an OK determination from a defective product to a defective product.

According to Embodiment, one or more of the following effects can be obtained.

1) It is possible to prevent lead frames (outer lead portions 4*p* and dam bars 14) which are not to be inspected from being reflected as the background around the plurality of resin sealing bodies 3 in the captured images captured at the time of performing the visual inspection of top surface and the bottom surface of the plurality of resin sealing bodies 3 constituting the packaging surface of semiconductor device.

2) According to the above 1), it is possible to obtain an extracted image suitable for the image determination using artificial intelligence (AI), and therefore it is possible to improve the correct answer rate of the image determination using artificial intelligence (AI).

3) In the image determination using artificial intelligence (AI), the number of images as the teacher data at the time of creating the learning model can be reduced. The number of images as the teacher data can be reduced from 64,000 to 1000, for example.

4) Since the image determination using artificial intelligence (AI) is used, it is unnecessary an operator's determination of a defective portion or an abnormal portion. In addition, when it is determined that the defective product is a defective product in the final determination, the visual inspection device 100 automatically announces the defective product, so that the operator can be appropriately notified of the defective product.

5) By monitoring the number of defective products determined in the final determination, it is possible to grasp the replacement timing of the mold of the transfer mold device, so that the mold can be used up to the appropriate use limit (life end). This can reduce the costs of semiconductor device.

While the invention made by the present inventor has been specifically described above based on the Embodiment, the present invention is not limited to the above-described embodiment and Embodiment, and it is needless to say that the present invention can be variously modified.

What is claimed is:

1. A visual inspection apparatus comprising:
a first illumination device capable of illuminating an top surface of an inspection object,
a second illumination device capable of illuminating a bottom surface opposite to the top surface of the inspection object,
a first imaging device capable of capturing the top surface of the inspection object, wherein
a relative position of each of the first illumination device and the second illumination device and the inspection object are adjusted such that an image of a part of the inspection object taken by the first imaging device cannot be recognized by light diffraction phenomenon using illuminated light from both of the first illumination device and the second illumination device.

2. The visual inspection apparatus according to claim 1, wherein
the inspection object is a lead frame having a mold region molded with a resin and a lead region formed a plurality of leads such that surround the mold region and
each of the plurality of lead extends in a first direction orthogonal to each side of the mold region and is arranged at equal interval.

3. The visual inspection apparatus according to claim 2, further comprising:
a support mechanism capable of supporting the inspection object and
a second imaging device capable of capturing the bottom surface of the inspection object.

4. The visual inspection apparatus according to claim 3, wherein
the first illumination device and the second illumination device are a dome shaped illumination device or a ring shape illumination device.

5. The visual inspection apparatus according to claim 4, wherein
the first illumination device and the second illumination device are the dome shaped illumination device and
each of the dome shaped illumination devices includes:
a light guide having an opening in a center of the light guide for taking an image of the inspection object and
a plurality of light sources arranged at equal interval on an inner side of the light guide such that illuminating the light guide from the inner side.

6. The visual inspection apparatus according to claim 5, wherein
the plurality of light sources are light emitting diodes.

7. The visual inspection apparatus according to claim 2, wherein
an illuminance of light incident on the inspection object is changed by a material of the lead frame.

8. The visual inspection apparatus according to claim 2, wherein
a wavelength of the light incident on the inspection object is 400 nm or more and 750 nm or less.

9. A method for manufacturing a semiconductor device, comprising the steps of:
(a) preparing a lead frame as an inspection object having a mold region molded with a resin and a lead region formed a plurality of leads so as to surround the mold region,
(b) illuminating light on an top surface of the inspection object and a bottom surface opposite to the top surface of the inspection object,
(c) taking a first image of the top surface of the inspection object so as not to be able to recognize the plurality of leads by light diffraction phenomenon using the light,
(d) extracting a first extracted image corresponding to a defect candidate portion in the first image,
(e) generating a first learned model generated by artificial intelligence using teacher data which are plurality of images in the mold region,
(f) determining presence or absence of a defect with respect to the first extracted image by using the first learned model and
(g) classifying whether the semiconductor device is defective or non-defective, wherein in the step of (g),
(g1) the semiconductor device is classified to be defective when the first learned model determines presence of the defect,
(g2) the semiconductor device is classified to be non-defective when the first learned model determines absence of the defect.

10. The method for manufacturing the semiconductor device according to claim 9, father comprising the steps of:
(c1) in the step of (c), taking a second image of the bottom surface of the inspection object so as not to be able to recognize the plurality of leads by light diffraction phenomenon using the light,
(d1) in the step of (d), extracting a second extracted image corresponding to a defect candidate portion in the second image,
(f1) in the step of (f), determining presence or absence of a defect with respect to the second extracted image by using the first learned model.

11. The method for manufacturing the semiconductor device according to claim 10, wherein
the step of (f) and (f1) are collectively proceeded.

12. The method for manufacturing the semiconductor device according to claim 9, father comprising the steps of:
(h) after the step of (c), before the step of (d), recognizing a package type of the semiconductor device from the first image,
(e1) in the step of (e), generating a second learned model based on the plurality of images in a mold region of the corresponding to the package type and
(f1) in the step of (f), determining presence or absence of a defect with respect to the first extracted image by using the second learned model when the package type is changed.

13. The method for manufacturing the semiconductor device according to claim 9, wherein
in the step of (b), an each of illuminance of the lights incident on the top surface of the inspection object and the bottom surface of the inspection object are 10360 lux or more and 10560 lux or less when the lead frame is made of a metallic material containing copper as a main component.

14. The method for manufacturing the semiconductor device according to claim 9, wherein
in the step of (b), an each of illuminance of the lights incident on the top surface of the inspection object and the bottom surface of the inspection object are 8750 lux or more and 8950 lux or less when the lead frame is made of a metallic material comprising 42 alloy as a main component.

15. A computer-readable program causing a computer to execute a visual inspection of a semiconductor device package, comprising:
inputting multi-tone image data to be obtained from an inspection object,
judging a package type from the multi-tone image data,
preparing a dataset corresponding to the package type,
generating a first learned model generated by artificial intelligence using the dataset as teacher data,
obtaining a first extracted image data corresponding to a defect candidate on the multi-tone image data by using the first learned model,
determining presence or absence of a defect by calculating a feature quantity of the first extracted image data and
classifying whether the semiconductor device is defective or non-defective based on calculated feature quantity.

16. The computer-readable program causing the computer to execute the visual inspection of the semiconductor device package according to claim 15, wherein
the inspection object is a lead frame having a mold region molded with a resin and a lead region formed a plurality of leads such that surround the mold region,
the multi-tone image data are obtained so as not to include the plurality of leads and
the dataset is composed of imaging data of the mold region.

* * * * *